(12) United States Patent
Espinasse (10) Patent No.: US 9,945,508 B2
(45) Date of Patent: Apr. 17, 2018

(54) FLEXIBLE PIPE FOR TRANSPORTING A CRYOGENIC FLUID, AND ASSOCIATED EQUIPMENT AND METHOD

(71) Applicant: TECHNIP FRANCE, Courbevoie (FR)

(72) Inventor: Philippe Espinasse, Bihorel (FR)

(73) Assignee: TECHNIP FRANCE (FR)

( * ) Notice: Subject to any disclaimer, the term of this patent is extended or adjusted under 35 U.S.C. 154(b) by 176 days.

(21) Appl. No.: 14/438,191

(22) PCT Filed: Oct. 31, 2013

(86) PCT No.: PCT/EP2013/072796
§ 371 (c)(1),
(2) Date: Apr. 23, 2015

(87) PCT Pub. No.: WO2014/072222
PCT Pub. Date: May 15, 2014

(65) Prior Publication Data
US 2015/0276118 A1    Oct. 1, 2015

(30) Foreign Application Priority Data

Nov. 8, 2012  (FR) ...................................... 12 03003

(51) Int. Cl.
*F16L 3/00* (2006.01)
*F16L 59/14* (2006.01)
(Continued)

(52) U.S. Cl.
CPC ................. *F16L 59/14* (2013.01); *F16L 1/24* (2013.01); *F16L 59/141* (2013.01); *F16L 59/153* (2013.01); *Y10T 29/49826* (2015.01)

(58) Field of Classification Search
USPC .......................... 138/121, 120, 130, 135, 106
See application file for complete search history.

(56) References Cited

U.S. PATENT DOCUMENTS 3,240,512 A * 3/1966 Pennington ................ F16L 1/24
138/178
3,454,051 A * 7/1969 Goepfert ................... F16L 1/24
114/243
(Continued)

FOREIGN PATENT DOCUMENTS

WO    WO 2011/092440 A1    8/2011

OTHER PUBLICATIONS

International Search Report dated Feb. 3, 2014 issued in corresponding International patent application No. PCT/EP2013/072796.
(Continued)

*Primary Examiner* — James Hook
(74) *Attorney, Agent, or Firm* — Ostrolenk Faber LLP (57) ABSTRACT

A pipe (18) having an inner fluid confinement assembly (30) including a corrugated inner tube (40) having an axis (A-A'), a tensile armor (42) arranged around the inner tube (40) and a heat-insulating assembly (44) arranged around the tensile armor (42). The pipe includes a ballast assembly (32) mounted around the inner assembly (30). The ballast assembly (32) includes a plurality of collars (70A) mounted externally on the inner assembly (30) to form a support layer (70), at least one outer armor (72) and at least one ballast ring (74A) engaged around the outer armor (72).

14 Claims, 6 Drawing Sheets

(51) Int. Cl.
*F16L 59/153* (2006.01)
*F16L 1/24* (2006.01)

(56) References Cited

U.S. PATENT DOCUMENTS

| | | | | |
|---|---|---|---|---|
| 4,344,462 A * | 8/1982 | Aubert | ............ | F16L 11/16 138/122 |
| 4,953,146 A * | 8/1990 | McMurry | ............ | G01V 1/201 367/154 |
| 5,278,804 A * | 1/1994 | Halvorsen | ............ | G01V 1/201 367/16 |
| 5,683,204 A * | 11/1997 | Lawther | ............ | F16L 1/16 405/158 |
| 6,030,145 A * | 2/2000 | Stewart, Jr. | ............ | E21B 17/015 405/171 |
| 6,854,516 B2 * | 2/2005 | Nish | ............ | E21B 17/012 166/350 |
| 7,069,955 B2 * | 7/2006 | Glejbol | ............ | F16L 59/153 138/134 |
| 7,543,613 B2 | 6/2009 | Adkins et al. | | |
| 7,677,837 B2 * | 3/2010 | Pionetti | ............ | B63B 22/021 405/171 |
| 7,749,035 B2 * | 7/2010 | Oram | ............ | E21B 17/012 405/171 |
| 8,322,438 B2 * | 12/2012 | Larson | ............ | E21B 17/012 138/106 |
| 2003/0159745 A1 * | 8/2003 | Espinasse | ............ | F16L 11/16 138/135 |
| 2005/0155663 A1 | 7/2005 | Dhellemmes | ............ | 138/149 |
| 2009/0159144 A1 * | 6/2009 | Dixon-Roche | ............ | F16L 11/08 138/33 |
| 2011/0017337 A1 * | 1/2011 | Kagoura | ............ | F16L 11/081 138/121 |
| 2011/0089679 A1 * | 4/2011 | Meredith | ............ | F16L 1/26 285/15 |
| 2011/0214771 A1 * | 9/2011 | Graham | ............ | E21B 17/01 138/109 |
| 2012/0207547 A1 * | 8/2012 | Guzick | ............ | E21B 17/012 405/166 |
| 2013/0251457 A1 * | 9/2013 | Melymuk | ............ | F16L 1/24 405/171 |
| 2013/0287499 A1 * | 10/2013 | Fraczek | ............ | F16L 1/20 405/171 |

OTHER PUBLICATIONS

Australian Examination Report No. 1, dated Jul. 26, 2017 issued in corresponding Australian Patent Application No. 2013343763. Total 4 pages.

* cited by examiner

FLEXIBLE PIPE FOR TRANSPORTING A CRYOGENIC FLUID, AND ASSOCIATED EQUIPMENT AND METHOD

CROSS REFERENCE TO RELATED APPLICATIONS

The present application is a 35 U.S.C. § 371 National Phase conversion of PCT/EP2013/072796, filed Oct. 31, 2013, which claims benefit of French Application No. 1203003, filed Nov. 8, 2012, the disclosure of which is incorporated herein by reference. The PCT International Application was published in the French language.

TECHNICAL FIELD OF THE INVENTION

The present invention concerns a flexible pipe for transporting cryogenic fluid, comprising:
an corrugated inner tube having an axis, the corrugated tube defining a sealed throughway for the circulation of cryogenic fluid;
a tensile armour, arranged around the inner tube;
a heat insulating assembly arranged around the tensile armour,
the pipe comprising a ballast assembly mounted around the inner assembly.

BACKGROUND OF THE INVENTION

Said pipe is intended to transport a cryogenic fluid derived for example from a gas liquefying process. The transported fluid is liquefied natural gas in particular having a boiling point lower than −163° C.
More generally, a cryogenic fluid transported by the pipe has a boiling point lower than 0° C.
Natural gas extracted from the ground is a major source of fuel that can be recovered.
To transport natural gas in gaseous form from its production site to a receiving site it is known to use pipelines. However, in numerous cases in particular when the production site is located in a body of water, it is simpler and more economical to transfer natural gas in liquid from to reduce the volume thereof during transport and facilitate storage and handling.
However, the handling of cryogenic fluids and in particular the offloading of cryogenic fluid from a floating liquefaction plant to a transport vessel, or from a transport vessel to a storage installation on land must be carried out in the vicinity of the shore, often by means of articulated arms connecting the vessel to the plant or to the storage installation.
Said articulated arms are not adapted for cases in which loading and offloading operations are performed at a distance from the shore in areas that are scarcely protected, in particular when the liquefaction units are positioned on floating installations of <<FLNG>> type.
In this case, the offloading of the liquefied gas can only be carried out when weather conditions are calm, which may make plant operation difficult.
In addition, flexible pipes of bonded or non-bonded type known for unloading hydrocarbon fluids at ambient temperature and are not suitable for transporting cryogenic fluids at temperatures lower than −40° C./−50° C. having regard to the very low temperatures of cryogenic fluids and their special properties.
To remedy this problem, application WO 2011/092440 by the Applicant proposes a flexible pipe which is particularly adapted for the fluid transport through a volume of air. On account of the heat insulating layers arranged in this pipe it is a floating pipe.
Therefore this pipe is not adapted as such for the subsea transfer of cryogenic fluid.
In this respect, U.S. Pat. No. 7,543,613 discloses an installation for transferring fluid between two vessels, comprising a catenary flexible conduit under the surface of the water to limit the impact of weather conditions on the fluid transfer system and improve the safety of operations.
To obtain such catenary configuration the conduit is weighted with a ballast assembly. However this document does not give any indication regarding the structure of this assembly. In particular, the ballast assembly must be capable of weighting the conduit without damaging the heat insulation and the mechanical properties thereof.

SUMMARY OF THE INVENTION

It is therefore one objective of the invention to obtain a pipe for transporting a cryogenic fluid across a body of water, which can be locally weighted in reliable manner without damaging the mechanical properties thereof or the integrity of its structure.
For this purpose, the subject of the invention is a pipe of the aforementioned type characterized in that the ballast assembly comprises:
a plurality of collars mounted externally on the inner assembly to form a support layer;
at least one outer armour;
at least one ballast ring engaged around the outer armour.
The pipe of the invention may comprise one or more of the following characteristics taken alone or in any technically possible combination:
the ballast assembly comprises an outer sheath in polymer material inserted between the outer armour and the support layer;
the inner assembly comprises an intermediate sheath arranged around the heat-insulating assembly, the support layer bearing upon the intermediate sheath;
each collar comprises at least two circumferential collar portions secured to one another;
the circumferential portions are secured to one another via tack welding;
each ballast ring is formed of a plurality of segments assembled onto each other;
each segment comprises a docking region on an adjacent segment, the docking region advantageously being T-shaped, the ballast ring comprising a securing mechanism inserted through the adjacent mooring regions;
at least one section of the flexible pipe is provided with ballast rings, at least one second section of the pipe being devoid of ballast ring;
the heat-insulating assembly comprises at least one heat-insulating layer formed by an aerogel.
A further subject of the invention is an installation for the transfer of cryogenic fluid comprising:
a first, advantageously floating, unit to receive the fluid;
a second, advantageously floating, unit to receive the fluid;
a flexible pipe such as described above arranged between the first unit and the second unit, a first end of the flexible pipe being mounted on the first unit, a second end of the flexible pipe being mounted on the second unit.

The installation of the invention may comprise one or more of the following characteristics taken alone or in any possible technical combination:

the flexible pipe comprises a central section devoid of ballast ring, and two adjacent sections surrounding the central section, each adjacent section being provided with at least one ballast ring, the pipe assuming a W-shaped configuration when immersed in the body of water.

A further subject of the invention is a method for manufacturing a flexible pipe such as described above, characterized in that it comprises the following steps of:

providing an corrugated inner tube of longitudinal axis defining a sealed throughway for the circulation of cryogenic fluid;

arranging an inner tensile armour around the corrugated tube;

placing a heat-insulating assembly around the tensile armour;

mounting a ballast element on the assembly;

characterized in that the mounting of the ballast element comprises the following phases:

mounting a plurality of collars externally on the inner assembly to form a support layer;

arranging an outer armour around the support layer;

assembling at least one ballast ring around the outer armour.

BRIEF DESCRIPTION OF THE DRAWINGS

The invention will be better understood on reading the following description given solely as an example and with reference to the appended drawings in which.

DESCRIPTION OF PREFERRED EMBODIMENTS

In the remainder hereof the terms <<upstream>> and <<downstream>> are generally meant in relation to the normal direction of circulation of a fluid though an element. The terms <<inner>> and <<outer>> are generally meant in relation to a central axis of an element.

Figure 1:
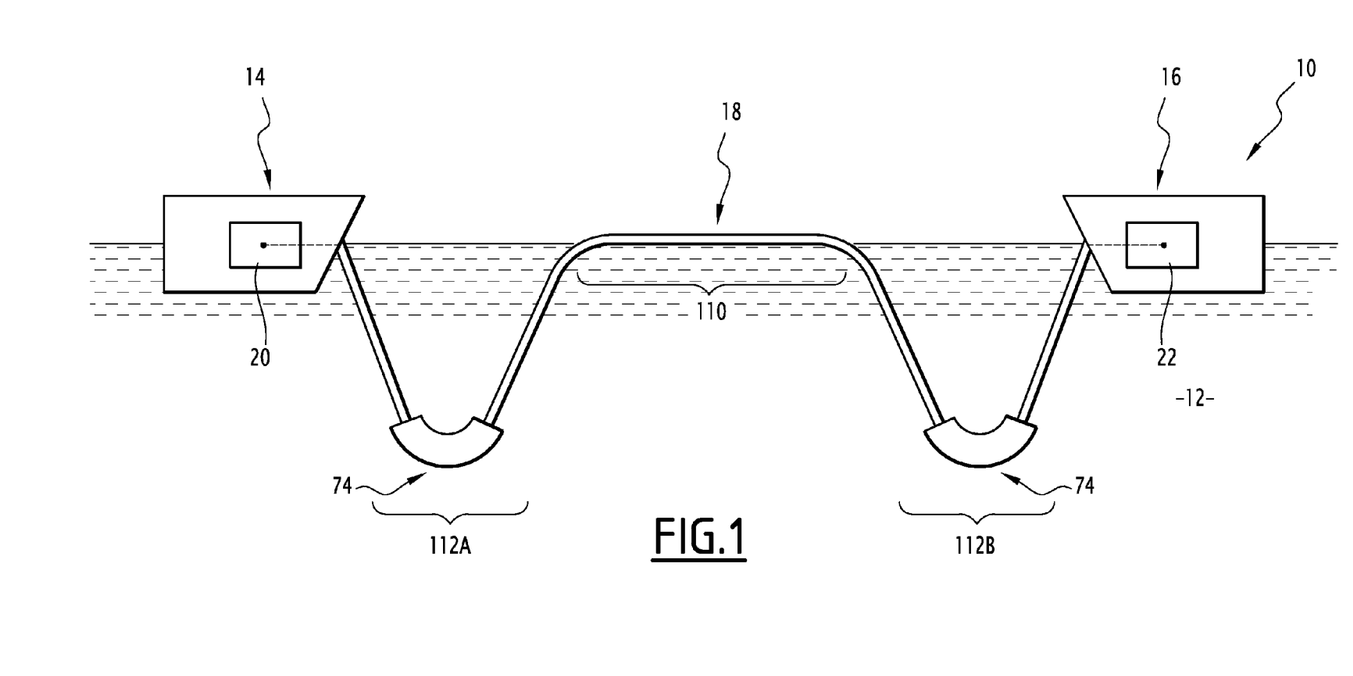
FIG. 1 is a schematic partial cross-sectional view of a first installation for the transfer of cryogenic fluid, comprising a first flexible pipe according to the invention.

FIG. 1 schematically illustrates a first installation 10 for transferring cryogenic fluid across a body of water 12.

The installation 10 comprises a first upstream unit 14 to receive cryogenic fluid, a second downstream unit 16 to receive cryogenic fluid and a first pipe 18 for transferring cryogenic fluid across the body of water 12.

The cryogenic fluid is intended to be transported via the pipe 18 between the upstream unit 14 and the downstream unit 16. Said fluid is a hydrocarbon for example in liquid form such as liquefied natural gas. The cryogenic fluid then has a boiling point lower than −163° C.

More generally a cryogenic fluid transported through the pipe 18 has a boiling point lower than 0° C.

The body of water 12 is a lake for example or sea or ocean. The depth of the body of water 12 above the installation 10 is between 15 meters and 4000 meters for example.

The upstream unit 14 is a floating structure for example on the body of water, such as a surface naval support, a semi-submersible platform, a floating vertical column or a vessel.

As a variant, the unit 14 is a fixed rigid structure of <<jacket>> type, or an oscillating structure anchored to the seabed.

The upstream unit 14 comprises an upstream tank 20 to receive cryogenic fluid. The upstream tank 20 is connected to a downstream end of the flexible pipe 18 via a connecting system (not illustrated).

In one advantageous variant, the upstream unit 14 comprises a gas liquefying unit to produce cryogenic fluid. Therefore the upstream unit 14 may be a floating unit for the production, storage and offloading of hydrocarbons designated by the acronym <<FPSO>>. As a variant the upstream unit 14 is a floating unit for storage and regasification designated by the acronym <<FSRU>>.

In this example, the downstream unit 16 is also a floating structure.

This downstream unit 16 is a vessel for example or barge, floating platform, intended to be connected to the upstream storage unit 14 to collect cryogenic fluid derived from the upstream unit 14.

The downstream unit comprises a downstream tank 22 for cryogenic fluid connected to a downstream end of the flexible pipe via a connecting system (not illustrated).

The flexible pipe 18 advantageously extends over a length of more than 30 meters and in particular extends between 50 meters and 300 meters. It delimits a central throughway 28, along local axis A-A' in FIG. 2, for circulation of the cryogenic fluid.

The flexible pipe 18 has a relatively small minimum bending radius (MBR) e.g. few meters. This makes it fit to be reversibly coiled and uncoiled without significant plastic deformation on a spool or cradle on-board a vessel.

The flexible pipe 18 is advantageously non-bonded. The constituent layers are not bonded together by a bonding material such as an adhesive but are free to slide locally in relation to one another, in particular during bending.

Figure 2:
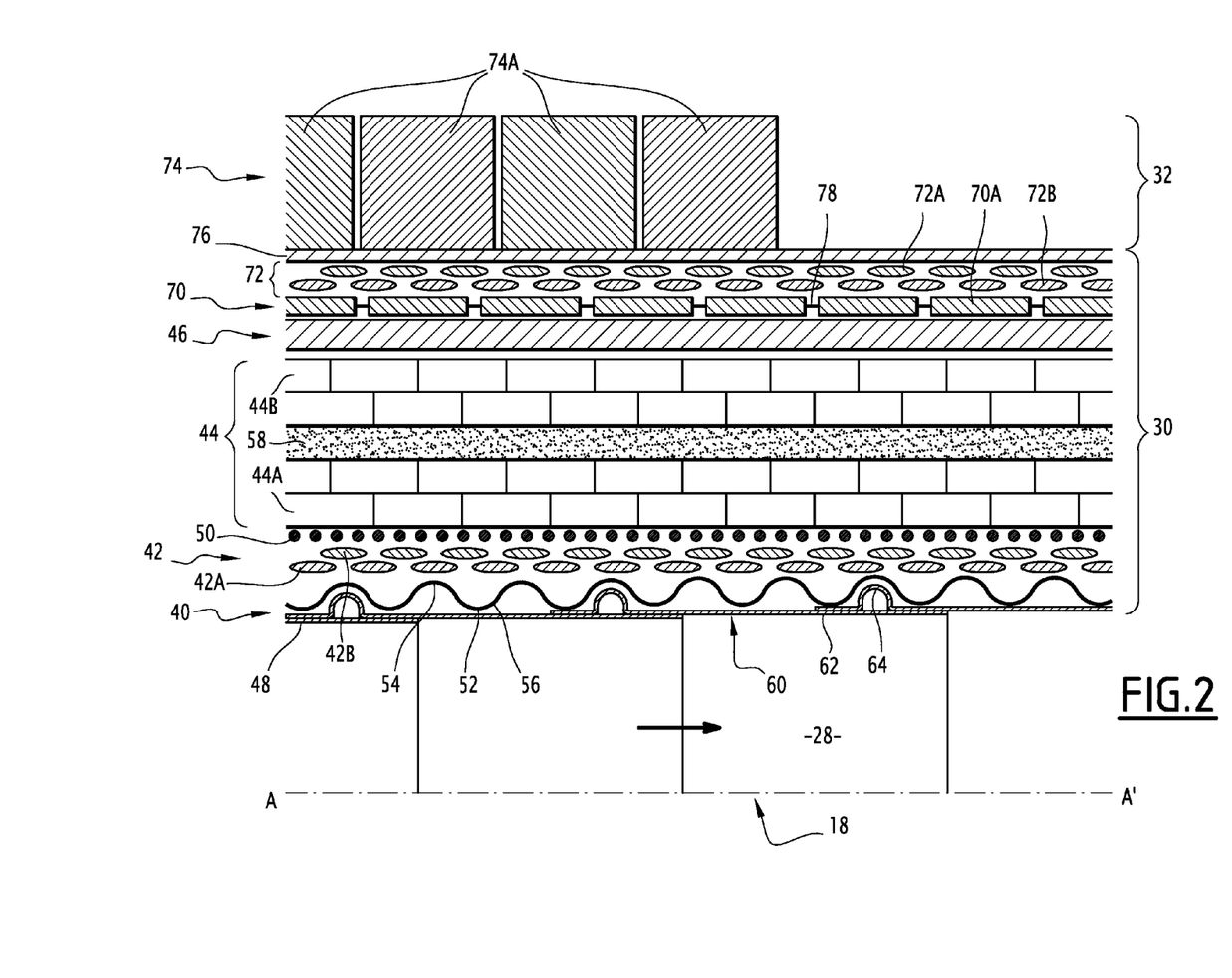
FIG. 2 is a schematic cross-sectional view along a median axial plane of the main layers of the first flexible pipe according to the invention.
Figure 3:
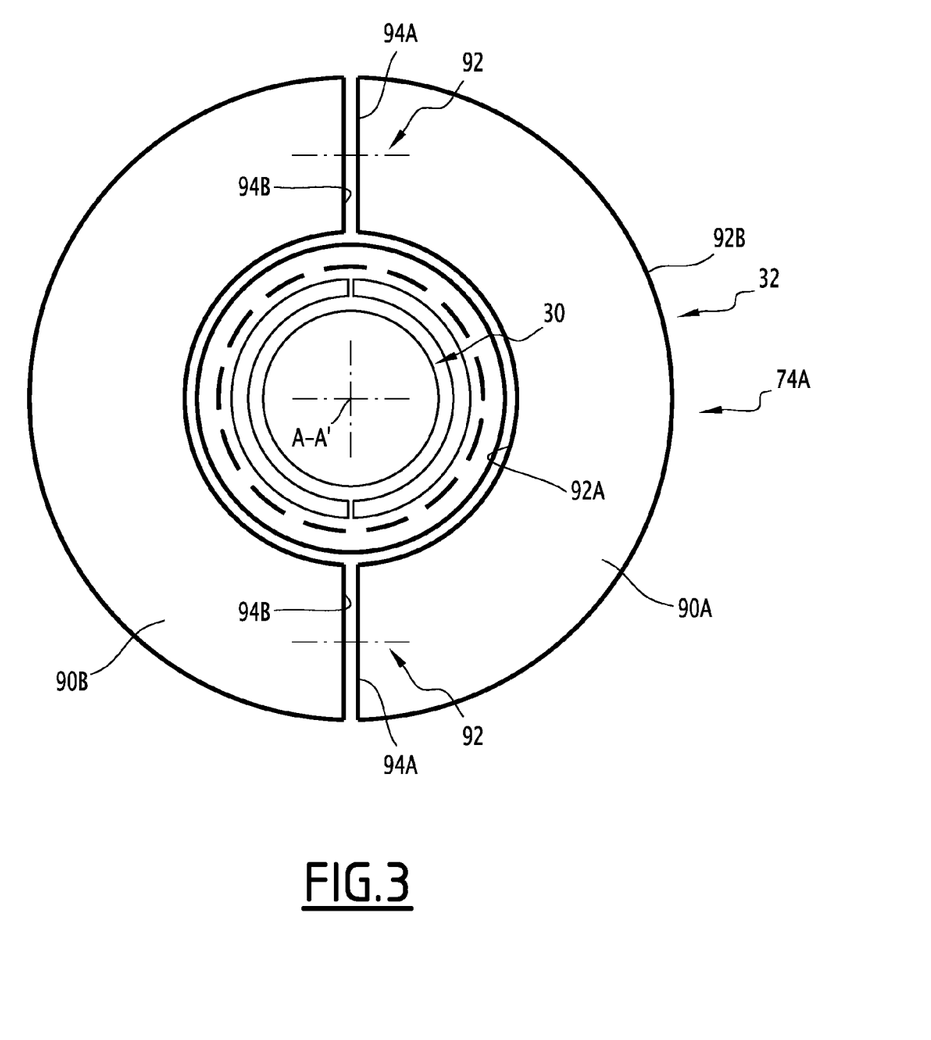
FIG. 3 is a schematic cross-sectional view along a transverse plane of the flexible pipe in FIG. 2.

As illustrated in FIGS. 2 and 3, the flexible pipe 18 comprises an inner assembly 30 to confine the cryogenic fluid, and an outer ballast assembly 32 arranged around the confinement assembly 30 over at least one portion of the length of the flexible pipe 18.

As illustrated in FIG. 2, the inner assembly 30 comprises an corrugated inner tube 40, at least one inner tensile armour 42 and at least one heat-insulating assembly 44 arranged around the inner armour 42.

The inner assembly 30 further comprises an intermediate sheath 46 arranged around the heat-insulating assembly 44.

The pipe 18 in the example in FIG. 2 optionally comprises an inner lining 48 to guide the fluid inside the corrugated tube 44 and a spiralled layer 50 arranged between the armour layers 42 and the insulating layers 44.

The inner corrugated tube 40 is metal-based. To ensure good temperature resistance to the circulation temperature of the cryogenic fluid, this tube is made in 304L or 316L steel for example.

The tube 40 advantageously has a mean diameter larger than 30 centimeters, for example between 30 centimeters and 60 centimeters.

In an axial direction parallel to the axis A-A', it has a plurality of corrugations 52 the pitch of which is at least ten times smaller than the mean diameter of the tube.

The corrugations 52 of the tube 40 are formed by a series of hollows 54 and ridges 56 axially delimiting the hollows 54.

The hollows 54 open radially into the axis A-A'. The maximum radial depth of the hollows 54 taken perpendicular to the axis A-A' between the top of a ridge 56 and the bottom of the hollow 54 is twenty times smaller than the mean diameter of the tube 40.

In the example illustrated in FIG. 1, the hollows 54 form a series of separated annular grooves parallel to one another. As a variant, the hollows 54 are formed by a continuous helical groove having an equal-sized pitch to the pitch of the corrugations 52.

The tube 40 is formed for example by an end-to-end assembly of a plurality of sections of corrugated tube, each section being formed for example by stamping. Each tube section comprises a plurality of corrugations for example more than ten corrugations 52. Each corrugated tube section defines a continuous inner surface that is impervious over its entire length and entire periphery.

One assembled together e.g. by welding, the sections of corrugated tube sections 40 from a continuous sealed conduit over its entire length.

As a variant, the tube 40 is formed by a coiling a band folded along at least one edge and stapled onto an adjacent edge of the band.

The tube 40 therefore offers resistance to internal pressure whilst guaranteeing some amount of flexibility due to the deformation displayed by the corrugations 52 of the tube 40, in particular at low temperatures of use.

The tensile armour 42 is formed by at least one layer 42A, 42B of tensile armour helically wound around the axis A-A'. Each armour layer 42A, 42B comprises elongate elements such as tapes and/or strands e.g. in synthetic material such as polyester, in composite material or in metal.

A first armour layer 42A is helically wound for example around the axis A-A' at a helix angle $+\alpha$ between 20° and 45° relative to the axis A-A'. A second armour layer 42B is wound for example at a helix angle $-\alpha$ on the outside the first layer 42A in contact with this layer 42B.

The inner tensile armour 42 advantageously has a thickness of between 1 mm and 4 mm. The tensile armour 42 is not bonded to the corrugated tube 40.

The optional spiralled layer 50 is wound around the inner armour 42, at a winding angle smaller than that of the armour layers 42A, 42B. The winding angle of the layer 50 is between 2° an 5° for example.

The spiralled layer 50 is made in a threadlike element e.g. in fibres of plastic material such as polyester fibres.

The spiralled layer 50 ensures reinforcement of the armour layers 42 and prevents the structure of these layers 42 from becoming disorganised when the pipe 18 is in use or when it is bent.

The spiralled layer 50 is not bonded to the armour layers 42.

In this example, the insulating assembly 44 comprises at least one heat-insulating layer 44A, 44B. It advantageously has at least insulating two similar insulating layers 44A, 44B separated by an intermediate sealing layer 58.

Each heat-insulating layer 44A, 44B is formed of a solid heat-insulating material having thermal conductivity of less than at least 300 times the thermal conductivity of the inner tube 40.

Each layer 44A, 44B is formed of foam for example, advantageously polyolefin foam or an aerogel.

In the example illustrated in FIG. 1, each heat-insulating layer 44A, 44B is formed for example of one or more bands of polyethylene foam wound around the axis A-A'.

The intermediate sealing layer 58 is advantageously formed of an adhesive band of rubber sealant. It ensures an additional seal for natural gas if the inner tube 40 no longer ensures this sealing.

The heat-insulating assembly 44 formed by the or each heat-insulating layer 44A, 44B and by the intermediate layer 50, if provided, has a greater thickness than the thickness of the inner tube 40, for example of between 3 cm and 15 cm.

Its global thermal insulation coefficient ensures that the inner temperature of the throughway 28 is maintained at a value that is lower or substantially equal to the boiling point of the cryogenic fluid, whilst preventing the formation of ice on the outside of the pipe 18.

The heat-insulating layers 44A, 44B are not bonded to the spiralled layer 50 or to the intermediate sheath 46 or to the inner armour 42.

The intermediate sheath 46 is intended to ensure a general seal between the outside of the pipe 18 and the inside of the pipe 18, to prevent the ingress of water into the inner assembly 30. For example, it is formed of spiralled bands of rubber PVC or aramid e.g. KEVLAR or an extruded or sprayed thermoplastic sheath.

Advantageously, the intermediate sheath 46 further comprises an additional heat-insulating sub-layer;

The intermediate sheath 46 is not bonded to the insulating layers 44A, 44B.

The inner lining 48, if provided, is formed for example by a series of cylindrical segments 60 axially engaged in one another inside the corrugated tube 40. It is in metal for example.

The inner lining 48 has a total length substantially equal to the total length of the corrugated tube 16.

Each segment 60 is of general cylindrical shape. It advantageously comprises a cylindrical body 62 of axis A-A' that is radially expandable and an external abutment 64 for axial abutting on the corrugated tube 16.

The structure of the inner sheath 48 is similar for example to the structure described in French application WO2011/092440 by the Applicant and will not be described in further detail.

As illustrated in FIGS. 2 and 3, the ballast assembly 32 comprises a support layer 70 intended to bear upon the inner assembly 30, an outer armour 72 wound around the support layer 70 and an outer layer 74 of adjacent ballast rings 74A.

The ballast assembly 32 advantageously comprises an outer sheath 76 in polymer material positioned between the outer armour 72 and the outer layer 74.

The support layer 70 is formed of a plurality of adjacent collars 70A mounted around the intermediate sheath 46.

The collars 70A are mounted longitudinally side-by-side around the intermediate sheath 46.

An intermediate space 78 separates the collars 70A of each pair of adjacent collars 70A. Therefore successive collars 70A are unattached and are not directly connected to each other.

Advantageously the length of the collars 70A is between 100 mm and 200 mm, advantageously it is 150 mm. The collars 70A are arranged in a pitch of between 200 mm and 300 mm, in particular of about 250 mm.

The collars 70A are all engaged around the intermediate sheath 46 without being attached to the sheath 46. This prevents damage to the sheath 46 or to an insulating layer 44A, 44B.

Advantageously, as illustrated in FIG. 3, each collar 70A is formed of a plurality of circumferential collar parts 80A, 80B, each circumferential part 80A, 80B extending in an angular sector of 180° or less around the axis A-A'.

In the example illustrated in FIG. 2, each collar 70A is formed of two semi-collars assembled together by tack welding.

Therefore each circumferential part 80A, 80B is in the shape of a cylinder portion. When the circumferential parts 80A, 80B are assembled onto each other they therefore form a continuous cylinder 70A around the axis A-A'.

Each collar 70A is made in metal for example e.g. steel. Each one advantageously has a thickness of between 2 mm and 10 mm, in particular between 4 mm and 5 mm.

The outer armour 72 comprises at least one ply of outer armours 72A, 72B, advantageously two plys of crossed-over outer armours 72A, 72B.

Each ply of outer armour 72A, 72B is advantageously formed by a helical winding of an elongate element such as a band in composite material e.g. Kevlar.

A first ply of armours 72A is helically wound for example around the axis A-A' at a helix angle +β of between 5° and 50° relative to the axis A-A'. A second ply of armours 72B is wound at a helix angle for example of −β on the outside of the first ply of armours 72A, in contact with this ply of armours 72A.

The number of armour plies 72A, 72B is generally between 1 and 4.

Each armour ply 72A, 72B is intended to transmit the stresses, related to the weight added by the ballast rings 74A, to the end parts of the pipe 18.

The outer sheath 76 is formed for example of a layer of polymer material such as a polyamide in particular PA11, or a polyolefin such as polyethylene. As a variant, the outer sheath 76 is formed of a fluorinated polymer such as polyvinylidene fluoride.

It is arranged on the outside of the armour layers 72A, 72B.

The support layer 70, outer armour 72 and outer sheath 76 extend continuously over the pipe 18, advantageously over the entire length of the pipe 18, or at least continuously between two end parts of each pipe section.

As illustrated in FIG. 3, the ballast rings 74A of the outer layer 74 are mounted around the outer sheath 76. They are advantageously formed of metal to provide the necessary weight for local adjustment of the floatability of the pipe 18.

Advantageously, each ballast ring 74A is formed of a plurality of segments 90A, 90B distributed at an angle on the periphery of the pipe 18 relative to the axis A-A'.

In the example illustrated in FIG. 3, the ring 74A comprises two segments 90A, 90B connected together via a securing mechanism 92. In the variant shown in FIGS. 4 to 6, the ring 74A comprises more than two segments, advantageously three segments 90A, 90B, 90C connected together via the securing mechanism 92.

The ring 74A has a density higher than 1 to reduce local floatability of the pipe 18 in the body of water 12.

The linear weight of the outer layer 74 on the sections of the pipe 18 provided with rings 74A is between 100 kg/m and 500 kg/m for example, to reach a typical weight of 50 tonnes for example over 200 m.

The segments 90A, 90B extend circumferentially around the axis A-A'. They have an inner surface 92A in the shape of a cylinder section intended to be applied onto the outer sheath 76, and an outer surface 92B advantageously in the form of a cylinder section.

The thickness of the ring 74A, between the inner surface 92A and outer surface 92B is advantageously thicker than the thickness of each collar 70A in the radial direction relative to axis A-A'.

Each segment 90A has a first docking region 94A on an adjacent segment 90B and a second docking region 94B on an adjacent segment 90B.

The docking regions 94A, 94B are advantageously formed on the circumferential edges of each segment 90A, 90B, substantially in a radial plane relative to the axis A-A'. Each docking region 94A of a first segment 90A is intended to be applied to a docking region 94B of a second segment 90B.

The securing mechanism, 92 is positioned between each first segment 90A and each adjacent second segment 90B. It is able to hold in position each docking surface 94A of a first segment 90A in relation to the docking surface 94B of a second segment 90B.

In one advantageous example, the securing mechanism 92 is formed by at least one screw/nut system engaged through each segment pair 90A, 90B.

The rings 74A can therefore easily be mounted and dismounted around the outer sheath 76. Such mounting can be performed when installing the pipe 18 in the body of water, after the manufacturing thereof, to adjust the configuration and local floatability of the pipe 18.

Figure 4:
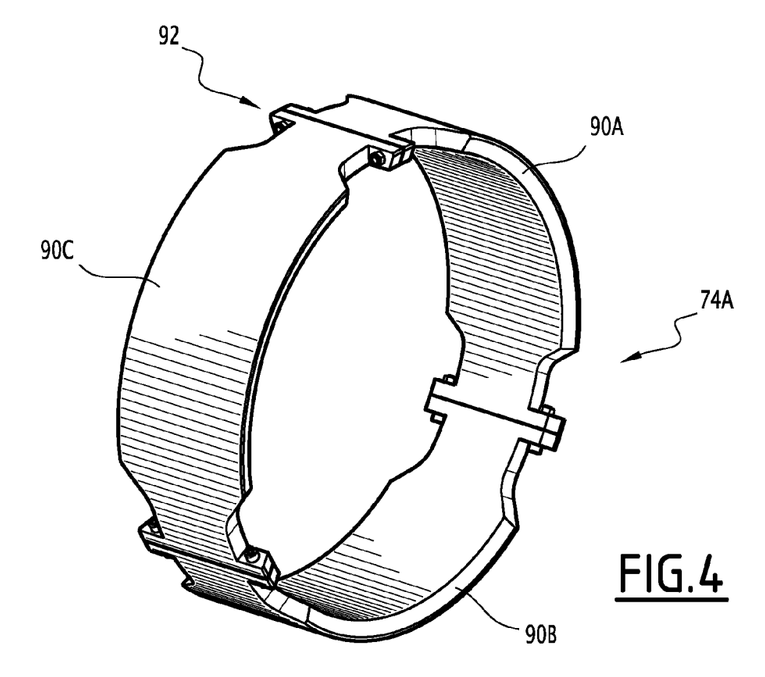
FIG. 4 is a perspective front three-quarter view of a variant of ballast ring intended for the pipe in FIG. 2.
Figure 5:
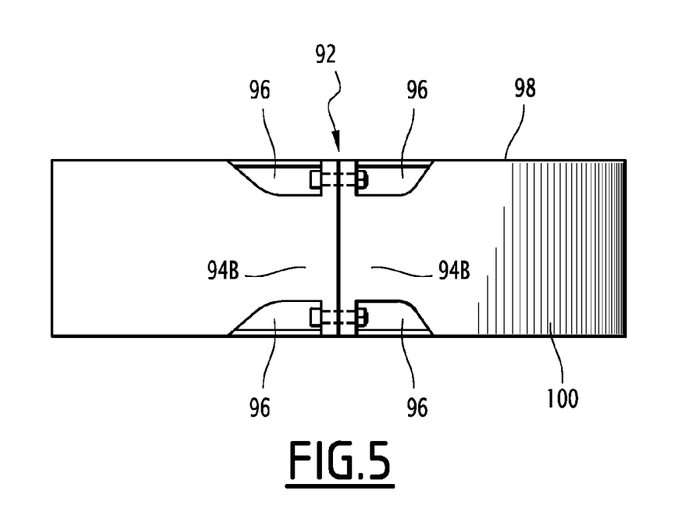
FIG. 5 is an overhead view of the ring in FIG. 4.
Figure 6:
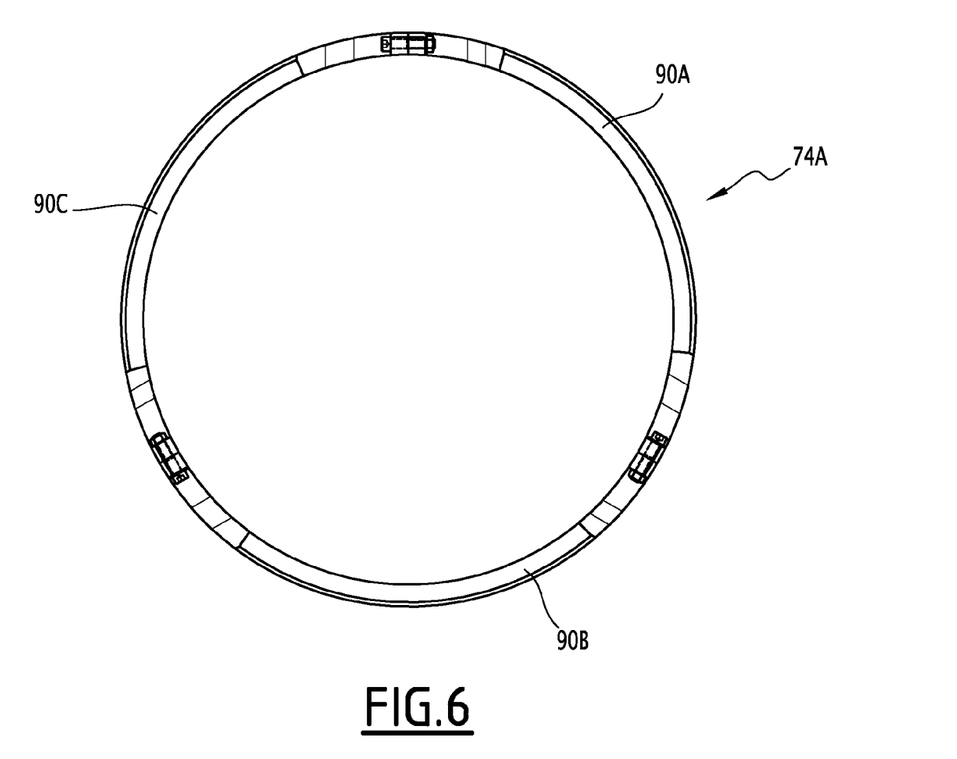
FIG. 6 is a side view of the ring in FIG. 4.

In the variant illustrated in FIGS. 4 and 5, each docking region 94A, 94B is substantially T-shaped. Each segment, in the vicinity of the docking region, delimits longitudinal notches 96 opening into an upstream edge 98 and downstream edge 100 respectively of the ring 74A.

The securing members 92 project through the free ends of the docking regions 94A, 94B located facing the notches 96, which allows easy insertion, mounting and dismounting of the securing mechanism.

In one advantageous configuration illustrated in FIG. 1, the pipe 18 comprises at least one central section 110 devoid of ballast rings 74A, and two adjacent sections 112A, 112B positioned either side of the central section 110 and provided with ballast rings 74A.

Therefore when the pipe 18 is immersed in the body of water, the central section 110 floats on the surface of the body of water 12 and remains close thereto, whereas the adjacent sections 112A, 112B have lesser floatability than the central section 110 and are therefore immersed under the surface of the body of water 12 below the central section 110.

The pipe 18 therefore has a W-shaped configuration when it is immersed in the body of water 12.

A method for manufacturing the flexible pipe 10 of the invention will now be described. Initially there is provided the inner corrugated tube 40.

If the corrugated tube 40 is formed of a plurality of sections, the different tube sections are assembled together.

Advantageously if an inner lining 48 is provided in the tube 40, this inner lining 48 is assembled inside the tube 40.

The inner armours 42 are then wound around the inner tube 40. If provision is made for a spiralled layer 50, this is spirally wound around the armour layers 42.

Next, the first insulating layer 44A, the intermediate layer 58 if provided, the second insulating layer 44B are arranged around the armour 42. Finally, the outer sealing layer is placed around the insulating assembly 44.

Once the inner assembly 30 has been mounted, the collars 70A are assembled around the intermediate sheath 46. A support layer 70 comprising collar parts 70A is thus formed around the intermediate sheath 48 and is held in position around this sheath.

The different circumferential parts of each collar 70A are mounted on one another advantageously by tack welding.

The outer armour layers 72A, 72B are then wound around the collars 70 in a manner known per se. The outer layer 76 is arranged around the outer armour 72 thus formed.

In a first variant, the pipe 18 fully devoid of rings 74A is wound around a spool or cradle on-board an installation structure.

At the time of installing the pipe 18 the ballast rings 74A are mounted around the outer sheath 76.

For this purpose, the different segments 90A, 90B, 90C are assembled together using the securing mechanisms 92 in the sections 112A, 112B which are intended to be provided with ballast rings 74A. The pipe 18 is then gradually deployed and connected to the upstream unit 14 and downstream unit 16.

As a variant, the ballast rings 74A are mounted on the pipe 18, before being loaded on the installing structure.

With the invention that has just been described it is possible to have available a flexible pipe 18 for transporting a cryogenic fluid, which can be immersed in a body of water 12 whilst guaranteeing the mechanical integrity of the pipe 18 and in particular of the heat-insulating layers 44A, 44B.

The pipe 18 of the invention is of particularly simple structure. The presence of ballast rings 74 mounted on different sections 112A, 112B of the pipe 18 allows the local adjustment of its floatability to obtain different installation configurations.

In one variant, at least one unit from among the upstream unit 14 and the downstream unit 16 is immersed in the body of water.

Figure 7:
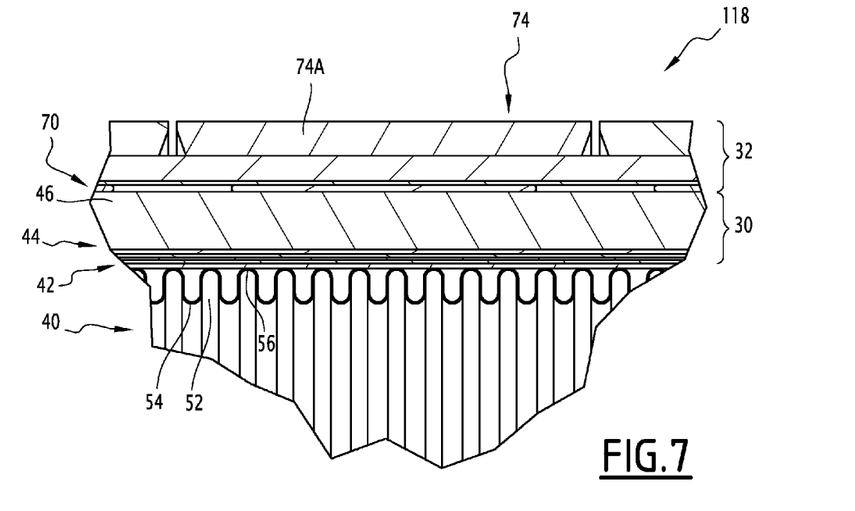
FIG. 7 is a similar view to FIG. 2 of a second pipe according to the invention.
Figure 8:
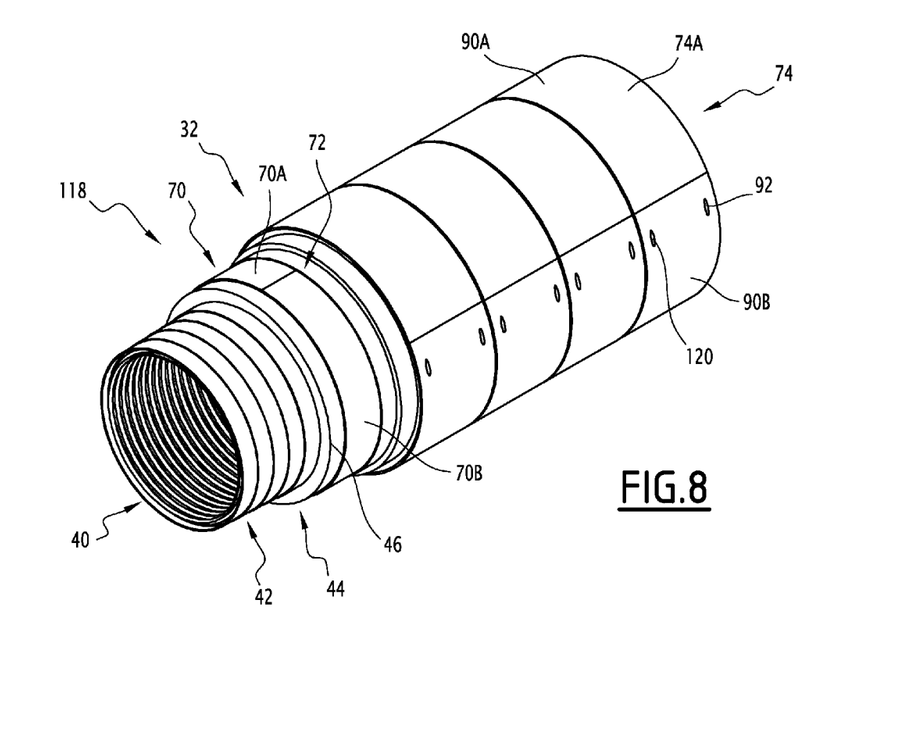
FIG. 8 is a partly exploded perspective view of the pipe in FIG. 7.

A second pipe 118 according to the invention is illustrated in FIGS. 7 and 8. Unlike pipe 18, this pipe 118 is devoid of an inner sheath 48 and of a spiralled layer 50. In addition, each segment 90A, 90B has an upstream edge 98 and a downstream edge 100 devoid of notches.

Boreholes 120 are pierced in each segment to allow the insertion of the blocking mechanism 92.

What is claimed is:

1. A flexible pipe for transporting a cryogenic fluid, having an inner fluid confinement assembly comprising:
    an inner corrugated tube having an axis, the corrugated tube defining a sealed throughway for circulation of the cryogenic fluid;
    a tensile armour arranged around the inner tube;
    a heat-insulating assembly arranged around the tensile armour,
    the pipe comprising a ballast assembly, mounted around the inner assembly;
the ballast assembly comprising:
    a plurality of collars, mounted externally on the inner assembly to form a support layer;
    at least one outer armour wound around the support layer;
    at least one ballast ring engaged around the outer armour, the ballast ring having a density higher than 1 to reduce local floatability of the flexible pipe in the body of water.

2. The pipe according to claim 1, wherein the ballast assembly comprises an outer sheath in polymer material inserted between the outer armour and the outer layer.

3. The pipe according to claim 1, wherein the inner assembly comprises an intermediate sheath arranged around the heat-insulating assembly, the support layer bearing upon the intermediate sheath.

4. The pipe according to claim 1, wherein each collar comprises at least two circumferential collar parts secured to one another.

5. The pipe according to claim 4, wherein the circumferential parts are secured to one another by tack welding.

6. The pipe according to claim 1, wherein each ballast ring is formed of a plurality of segments assembled together.

7. The pipe according to claim 6, wherein each segment comprises a docking region on an adjacent segment, the ballast ring comprising a securing mechanism inserted through adjacent docking regions.

8. The pipe according to claim 7, wherein the docking region is T-shaped.

9. The pipe according to claim 1, wherein at least one section of the flexible pipe is provided with ballast rings, at least one second section of the pipe being devoid of a ballast ring.

10. The pipe according to claim 1, wherein the heat-insulating assembly comprises at least one heat-insulating layer formed by an aerogel.

11. An installation for transferring cryogenic fluid comprising:
    a first unit to receive the fluid;
    a second unit to receive the fluid;
    a flexible pipe according to claim 1 arranged between the first unit and the second unit, a first end of the flexible pipe being mounted on the first unit, a second end of the flexible pipe being mounted on the second unit.

12. The installation according to claim 11, wherein the flexible pipe comprises a central section devoid of ballast ring, and two adjacent sections surrounding the central section, each adjacent section being provided with at least one ballast ring, the pipe assuming a W-shaped configuration when immersed in the body of water.

13. The installation according to claim 12, wherein the first unit is a floating unit, the second unit being a floating unit.

14. A method for manufacturing a flexible pipe according to claim 1, comprising the following steps:
    providing a corrugated inner tube of longitudinal axis defining a sealed throughway for circulation of the cryogenic fluid;
    arranging an inner tensile armour around the corrugated tube;
    placing a heat-insulating assembly around the tensile armour;
    mounting a ballast element on the assembly;
the mounting of the ballast element comprising following phases:
    mounting a plurality of collars externally over the inner assembly to form a support layer;
    arranging an outer armour around the support layer;
    assembling at least one ballast ring around the outer armour.

* * * * *